United States Patent [19]

Muir

[11] Patent Number: 4,998,864
[45] Date of Patent: Mar. 12, 1991

[54] SCROLL MACHINE WITH REVERSE ROTATION PROTECTION

[75] Inventor: Earl B. Muir, Sidney, Ohio

[73] Assignee: Copeland Corporation, Sidney, Ohio

[21] Appl. No.: 419,463

[22] Filed: Oct. 10, 1989

[51] Int. Cl.$^5$ .............................................. F01C 21/00
[52] U.S. Cl. ..................................... 417/410; 417/319; 417/902; 418/69
[58] Field of Search ............. 192/41 R; 417/319, 410, 417/902; 418/69

[56] References Cited

U.S. PATENT DOCUMENTS

| | | | |
|---|---|---|---|
| 2,922,378 | 1/1960 | Pabst | 418/69 X |
| 3,509,743 | 5/1970 | Johnson | 192/41 R |
| 3,918,830 | 11/1975 | Schneider | 192/41 R |
| 4,820,130 | 4/1989 | Eber et al. | 417/32 |
| 4,836,347 | 6/1989 | Johnson et al. | 192/41 R |

FOREIGN PATENT DOCUMENTS 248990  10/1988  Japan ................................... 418/69

OTHER PUBLICATIONS 3 pages from advertising brochure, Torrington, pp. 160, 162, 163, undated.

Primary Examiner—Robert G. Nilson
Attorney, Agent, or Firm—Harness, Dickey & Pierce

[57] ABSTRACT

An improved scroll compressor is disclosed which incorporates a one-way clutch operative to prevent reverse rotation of the orbiting scroll member. In one embodiment the one-way clutch also serves as a lower bearing for supporting the drive shaft whereas in another embodiment a separate bearing member is utilized in connection with the one-way clutch.

11 Claims, 2 Drawing Sheets

SCROLL MACHINE WITH REVERSE ROTATION PROTECTION

BACKGROUND AND SUMMARY OF THE INVENTION

The present invention relates generally to scroll type compressors and more specifically to scroll type compressors incorporating a one-way clutch operative to prevent reverse movement of the orbiting scroll member.

Scroll type machines are becoming more and more popular for use as compressors in both refrigeration as well as air conditioning applications due primarily to their capability for extremely efficient operation. Generally, these machines incorporate a pair of intermeshed spiral wraps, one of which is caused to orbit relative to the other so as to define one or more moving chambers which progressively decrease in size as they travel from an outer suction port toward a center discharge port. An electric motor is provided which operates to drive the orbiting scroll member via a suitable drive shaft. Because scroll compressors depend upon a seal created between opposed flank surfaces of the wraps to define successive chambers for compression, suction and discharge valves are generally not required. However, when such compressors are shut down, either intentionally as a result of the demand being satisfied or unintentionally as a result of a power interruption, there is a strong tendency for the pressurized chambers and/or backflow of compressed gas from the discharge chamber to effect a reverse orbital movement of the orbiting scroll member and associated drive shaft. This reverse movement often generates objectionable noise or rumble. Further, in machines employing a single phase drive motor, it is possible for the compressor to begin running in the reverse direction should a momentary power failure be experienced. This reverse operation may result in overheating of the compressor and/or other damage to the apparatus. Additionally, in some situations, such as a blocked condenser fan, it is possible for the discharge pressure to increase sufficiently to stall the drive motor and effect a reverse rotation thereof. As the orbiting scroll rotates in the reverse direction, the discharge pressure will decrease to a point where the motor again is able to overcome this pressure head and rotate the scroll member in the "forward" direction. However, the discharge pressure will now increase to a point where the cycle is repeated. Such cycling may also result in damage to the compressor and/or associated apparatus.

The present invention overcomes these problems by incorporating a one-way clutch coupled to the drive shaft which effectively prevents the orbiting scroll member from moving in a reverse direction thereby eliminating the objectionable noise generated upon shut down of the compressor. Further, this one-way clutch operates to resist damage to the motor and/or compressor resulting from a reversing of single phase motors as well as resisting the cyclical reversing resulting from a blocked or failed condenser fan. In this latter situation, the motor may still stall but the one-way clutch will hold it against reverse rotation until such time as the thermally actuated motor protector is tripped, thus avoiding potential damage thereto.

In one embodiment, the one way clutch is disposed within a recess provided in the lower bearing housing axially adjacent the bearing surfaces. In another embodiment, the one-way clutch serves the dual function of also providing the radial bearing support for the rotating drive shaft.

Additional advantages and features of the present invention will become apparent from the subsequent description and the appended claims taken in conjunction with the accompanying drawings.

DESCRIPTION OF THE PREFERRED EMBODIMENTS

Figure 1:
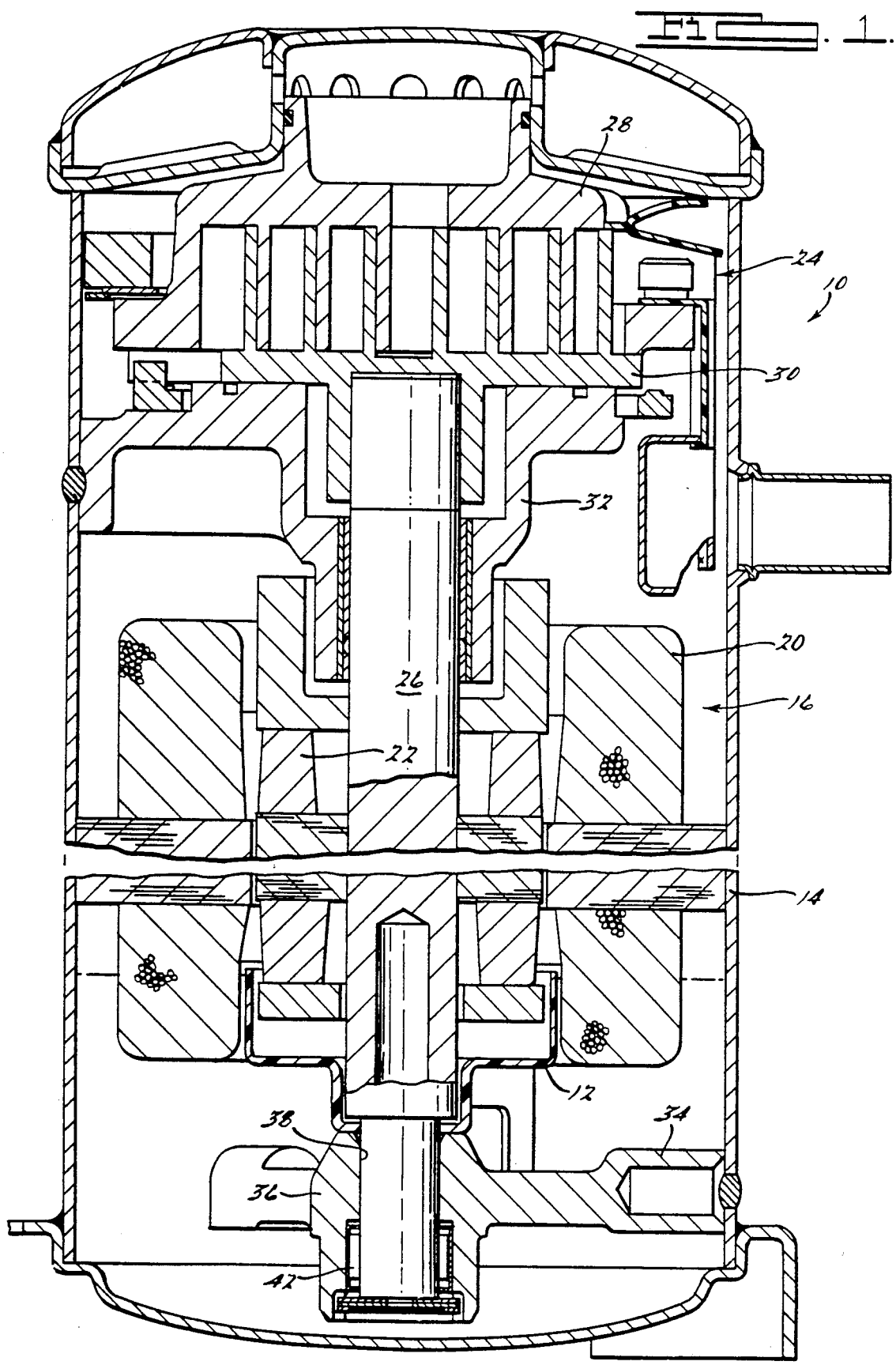
FIG. 1 is a section view of a scroll type refrigeration compressor incorporating a one-way clutch in accordance with the present invention.

Referring now to the drawings and in particular to FIG. 1, there is shown a scroll type refrigeration compressor 10 in accordance with the present invention. Compressor 10 comprises an outer shell or housing 14 within the lower portion of which is disposed an electric motor 16 including a stator 20 and a rotor 22. Motor 16 is operative to drive a compressor assembly 24 disposed in the upper portion of shell 14 via a drive shaft 26 extending therebetween and to which rotor 22 is secured adjacent the lower end. As shown, compressor assembly 24 incorporates an upper fixed scroll member 28 and a lower scroll member 30 which is driven by drive shaft 26 in orbiting motion relative to the fixed scroll member 28. Drive shaft 26 is rotatably supported within shell 14 by means of upper and lower bearing assemblies 32 and 34 respectively, each of which are fixedly secured to shell 14. Compressor 10 is described in greater detail in U.S. Pat. No. 4,767,293, entitled "Scroll Type Machine With Axially Compliant Mounting" assigned to the same assignee as the present application, the disclosure of which is hereby incorporated by reference.

Lower bearing assembly 34 includes a center portion 36 having an elongated bore 38 extending therethrough which is designed to receive the lower end of drive shaft 26. The upper portion of bore 38 is sized so as to provide a suitable bearing surface for journaling the lower end of the shaft 26. The lower portion of bore 38 is enlarged in diameter and has fitted therein a suitable one-way clutch assembly 42 in surrounding relationship to the lower end of shaft 26. Preferably, clutch assembly 42 will be press fitted within the enlarged diameter portion of bore 38 so as to be able to resist relative rotation therebetween. A pair of axial thrust plates 44, 46 are positioned within bore 38 in abutting relationship to end 48 of shaft 26 and are retained by means of a snap ring 50.

Figure 2:
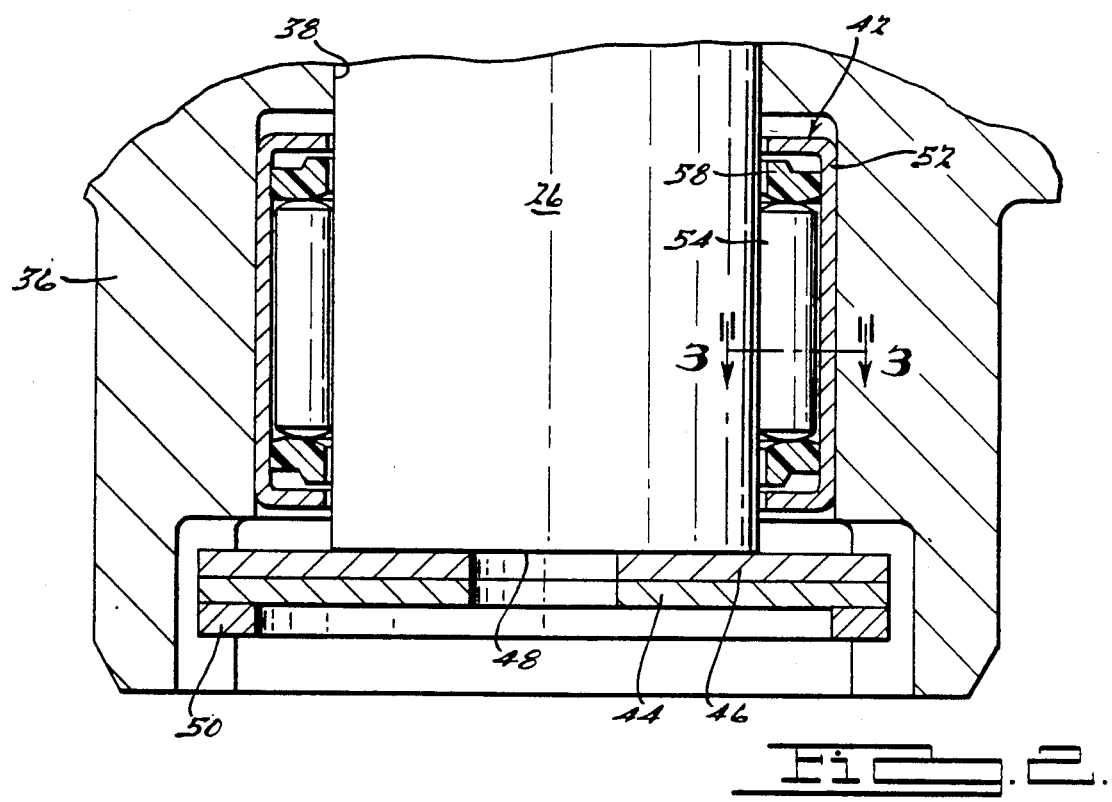
FIG. 2 is an enlarged fragmentary section view of the lower bearing assembly of the compressor shown in FIG. 1.
Figure 3:
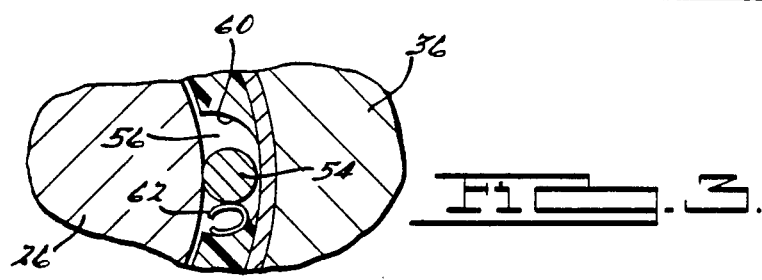
FIG. 3 is a fragmentary section line of the one-way clutch shown in FIG. 2, the section being taken along line 3—3 thereof.
Figure 4:
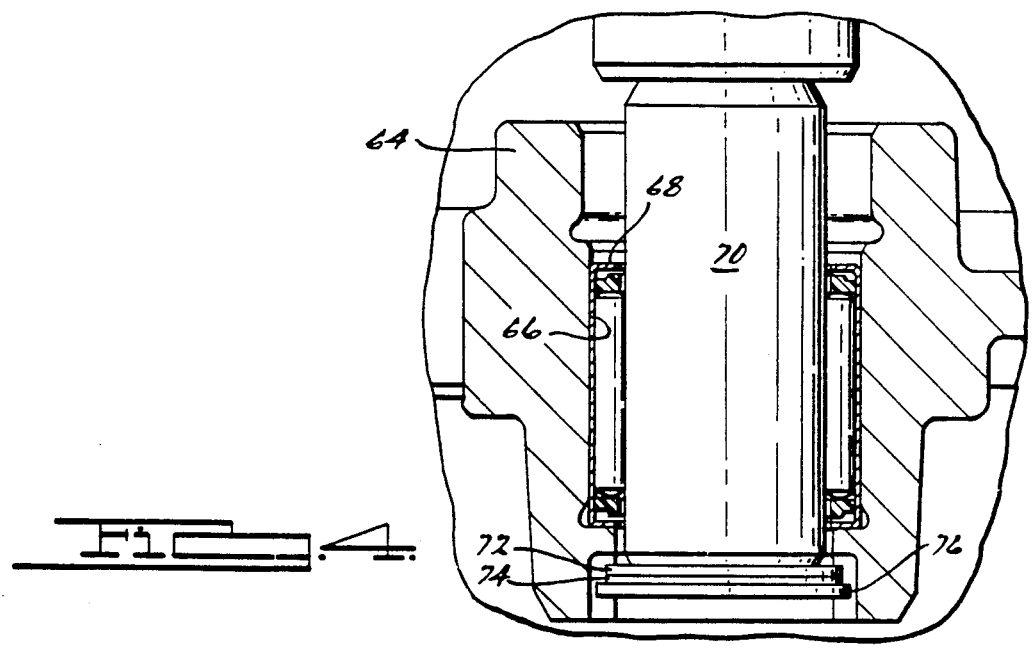
FIG. 4 is a view similar to that of FIG. 2 but showing another embodiment of the present invention.

As best seen with reference to FIGS. 2 and 3, clutch assembly 42 includes an outer housing 52 within which are disposed a plurality of circumferentially spaced roller pins 54 rotatably supported within cavities 56 provided in a retainer cage 58. Each of the cavities 56 is substantially identical extending over the full length of pins 54 and includes a rear wall 60 which tapers in a circumferential direction from one end wherein it merges into the inner surface of housing 52 and is positioned at a maximum radial distance from the axis of rotation of shaft 26 to a minimum radial distance therefrom. At the maximum radial distance location the distance between shaft 26 and housing 52 will be equal to or slightly greater than the diameter of pins 54. It should be noted that this presumes clutch 43 performs no bearing function. If desired and in those applications wherein clutch 42 also performs a bearing function such as described below, pin 54 will have a diameter substantially equal to this maximum radial distance so as to be able to rotatably support shaft 26. Spring biasing means 62 is also disposed within each cavity which operates to urge pin 54 toward the radially shallower end of each cavity 56. Thus, as shown in FIG. 3, rotation of shaft 26 in a clockwise direction will act to move pin 54 against spring 62 and into an area of cavity 56 wherein pin 54 may rotate freely under action of shaft 26. However, should the direction of rotation of shaft 26 be reversed, the action of biasing means 62 and shaft 26 will cause pin 54 to move into a shallower area of cavity 56 and thereby exert a wedging action between wall 60 and the outer surface of shaft 26 thereby preventing reverse rotation thereof. In this way, shaft 26 is effectively prevented from rotating in a reverse direction which will thus prevent orbiting scroll member 30 from orbiting in a reverse direction. In a presently preferred embodiment, it has been found that a Torrington Model RC-162110-FS clutch assembly has provided satisfactory performance.

While the above-described embodiment incorporates separate radial thrust bearings for supporting shaft 26, it is possible for the one-way clutch mechanism to be sized to perform both the bearing support function as well as preventing reverse rotation of the shaft. Such an embodiment is illustrated in FIG. 5 wherein lower bearing housing 64 is provided with an elongated center bore 66 within which bearing/clutch assembly 68 is press fitted. Shaft 70 is received within and rotatably supported by bearing/clutch assembly 68 against radially directed thrust loads. Axial thrust loads are taken by thrust bearings 72, 74 retained in position by snap ring 76 in the same manner as described above. Bearing/clutch assembly 68 is similar in construction and operation to clutch assembly 42 except as may be expected will be selected to handle both the loads resulting from reverse rotation as well as the running bearing loads exerted by shaft 70.

As may now be appreciated, both embodiments provide an effective means by which the annoying noise and possible damage to the compressor resulting from reverse rotation may be effectively prevented. Further, the use of a one-way clutch as diclosed herein eliminates the need to incorporate costly suction and/or discharge valving to restrict or avoid backflow of compressed gas which may precipitate reverse motion problems and which valving tends to further restrict gas flow through the compressor thus potentially reducing efficiency thereof.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

What is claimed is:

1. A refrigeration compressor comprising:
compressor means;
motor means including a rotor and stator;
shaft means coupled to said compressor means and having said rotor secured thereto for operatively driving said compressor means;
a bearing housing for rotatably supporting said shaft means; and
one-way clutch means disposed within said bearing housing and being operative between said shaft means and said bearing housing to prevent rotation of said shaft means in one direction while allowing rotation thereof in the other direction whereby movement of said compressor means in said one direction may be prevented.

2. A refrigeration compressor as set forth in claim 1 wherein said clutch means is positioned in surrounding relationship to said shaft.

3. A refrigeration compressor as set forth in claim 2 wherein said clutch means is press fitted within said bearing housing.

4. A refrigeration compressor as set forth in claim 2 wherein said clutch means includes bearing means rotatably supporting said shaft within said bearing housing.

5. A scroll type refrigeration compressor comprising:
an outer shell;
compressor means disposed in an upper portion of said shell, said compressor means including first and second interleaved scroll members supported for relative orbital movement therebetween so as to define moving fluid pockets of changing volume;
motor means disposed within said shell below said compressor means and including a stator and a rotor;
a drive shaft drivingly connected to said compressor means, said rotor being secured to said drive shaft and operative to rotatably drive same;
upper and lower bearing housings for rotatably supporting said drive shaft; and
one-way clutch means disposed within one of said upper and lower bearing housings, said one-way clutch means cooperating with said shaft to allow rotation thereof in one direction and to prevent rotation thereof in the other direction.

6. A refrigeration compressor as set forth in claim 5 wherein said clutch means further operates as a bearing for rotatably supporting said drive shaft.

7. A refrigeration compressor as set forth in claim 5 wherein said clutch means is disposed within said lower bearing housing.

8. A refrigeration compressor as set forth in claim 7 further comprising a lubricant sump containing a supply of lubricant disposed in the lower portion of said shell, said lower bearing housing being disposed within said sump.

9. A refrigeration compressor as set forth in claim 8 wherein said clutch means further operates as a bearing for rotatably supporting said drive shaft.

10. A scroll type refrigeration compressor comprising:
an outer shell;
compressor means disposed in said shell, said compressor means including first and second interleaved scroll members supported for relative orbital movement therebetween so as to define moving fluid pockets of changing volume;

motor means disposed within said shell and including a stator and a rotor;

a drive shaft drivingly connected to said compressor means, said rotor being secured to said drive shaft and operative to rotatably drive same;

upper and lower bearing housings for rotatably supporting said drive shaft; and one-way clutch means disposed within said shell, said one-way clutch means operating between a non-rotating portion of said compressor and said shaft to allow rotation of said shaft in one direction and to prevent rotation thereof in the other direction.

11. A refrigeration compressor as set forth in claim 10 wherein said one-way clutch means comprises the sole means for preventing rotation of said shaft in said other direction.

* * * * *